Figure 17:
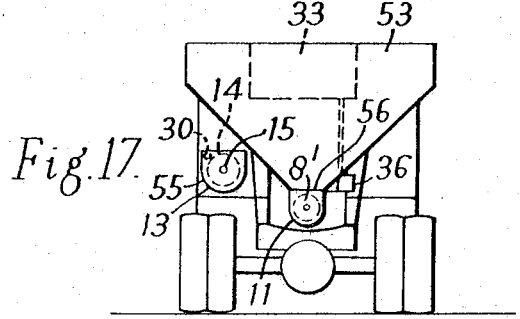

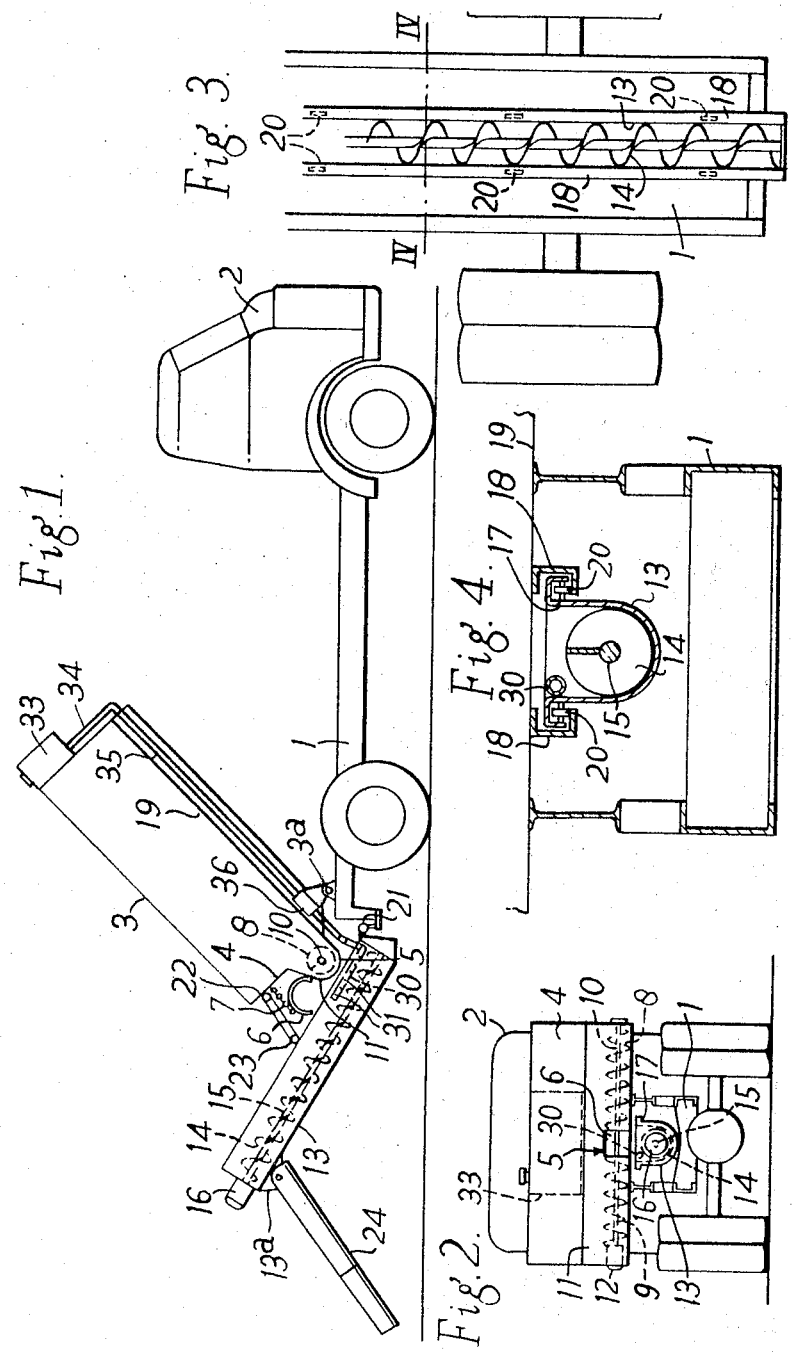

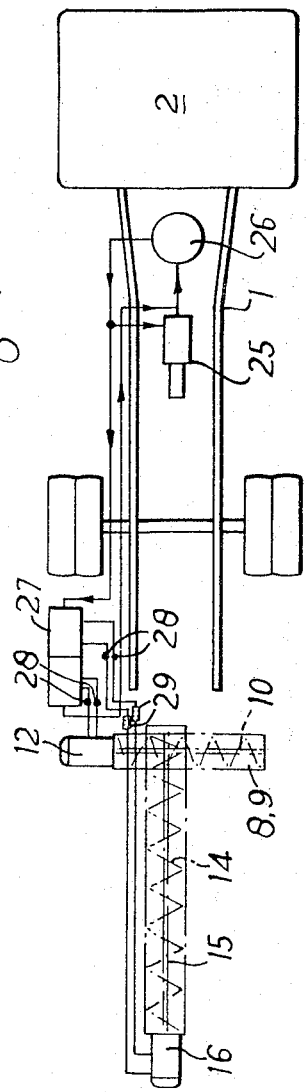

Feb. 28, 1967  G. J. GALLAGHER  3,306,590
MIXING PLANT
Filed May 26, 1965
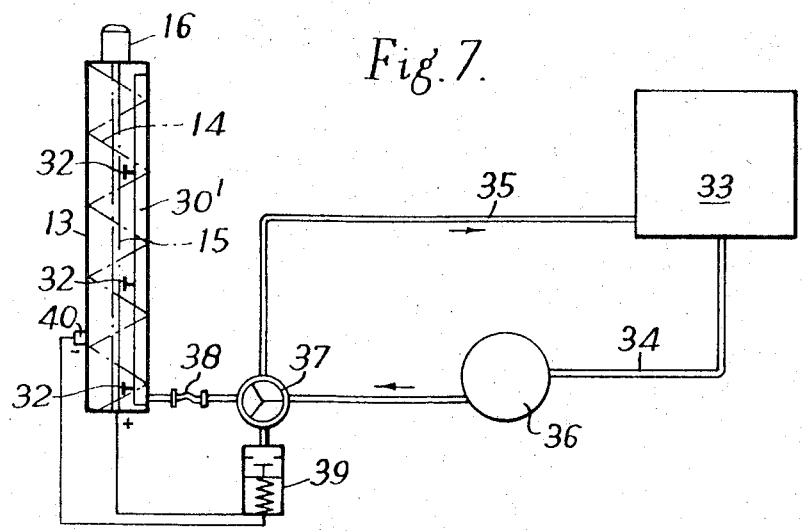
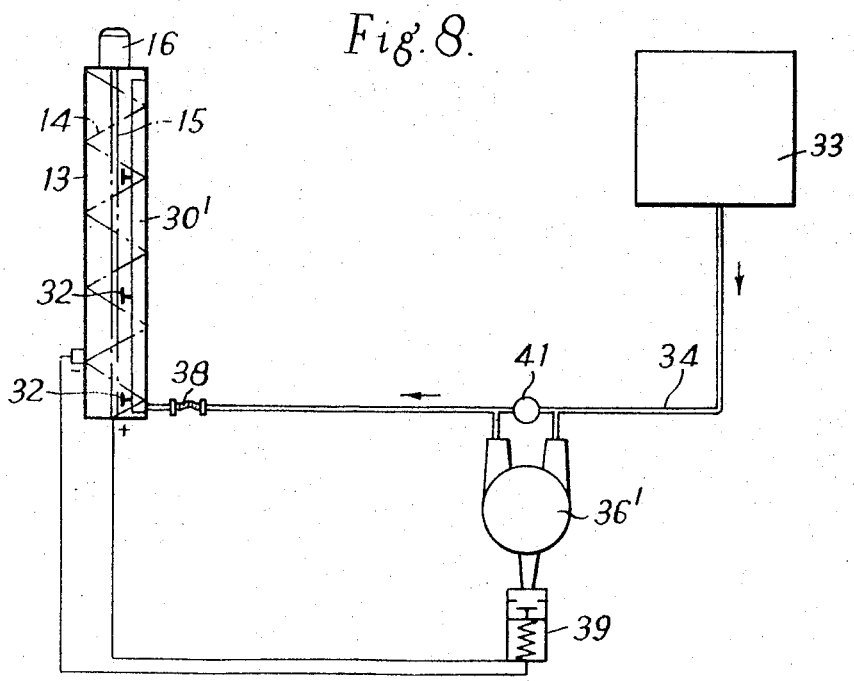

Feb. 28, 1967    G. J. GALLAGHER    3,306,590
MIXING PLANT
Filed May 26, 1965    7 Sheets-Sheet 4
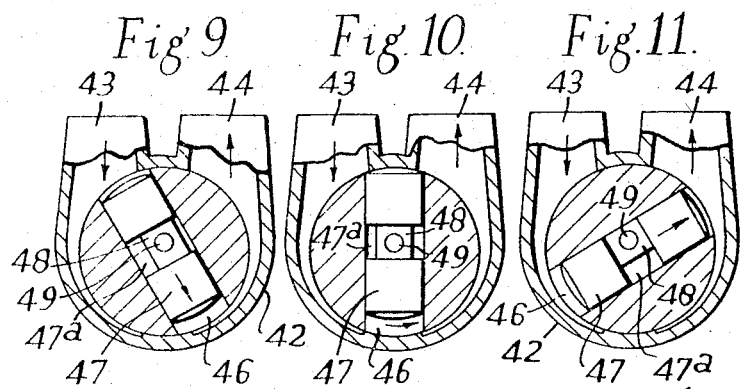
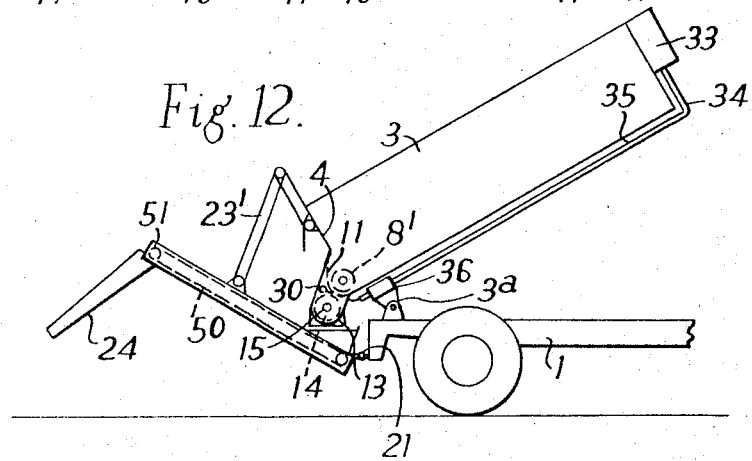
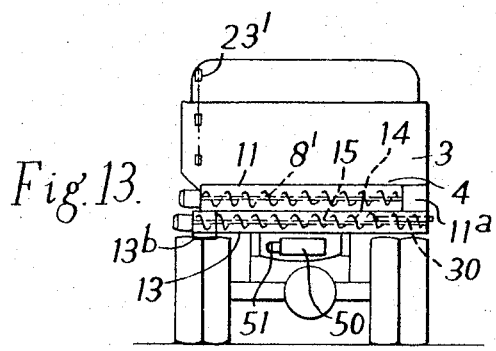

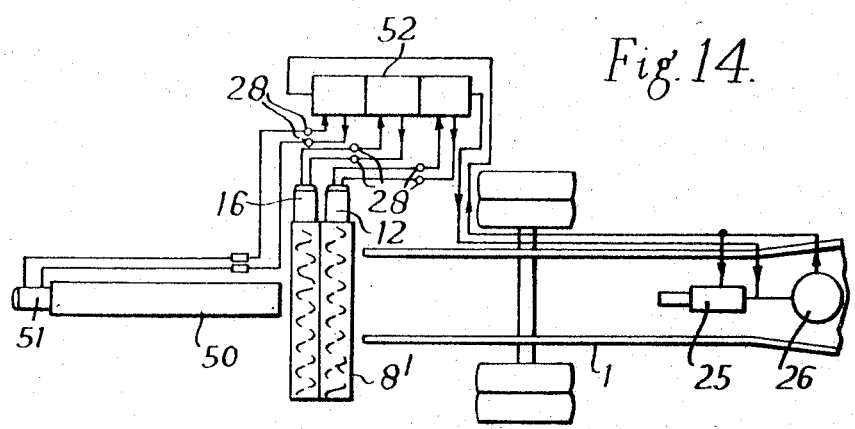
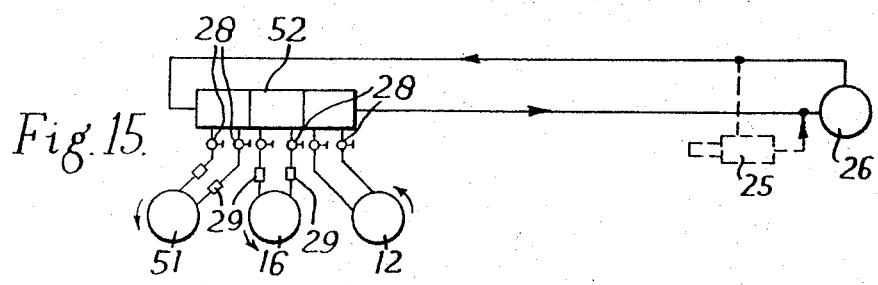
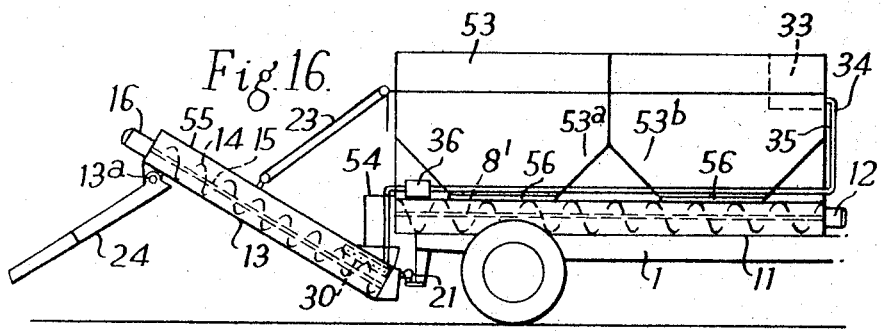

United States Patent Office 3,306,590
Patented Feb. 28, 1967

3,306,590
MIXING PLANT
Gerard J. Gallagher, Newcastle-upon-Tyne, England, assignor to Gibson Readymix Concrete Limited, Gateshead, England, a British company
Filed May 26, 1965, Ser. No. 459,053
Claims priority, application Great Britain, June 18, 1964, 25,169/64
10 Claims. (Cl. 259—161)

This invention appertains to mixing plant, both for distributing mixing water throughout a load of concrete, mortar or the like in a dry-mixed or a moist-mixed condition, and also for securing the controlled discharge of the load in a thoroughly mixed wet condition from a wheeled transport vehicle or a site storage and mixing hopper or the like.

Thus, although it is primarily the intention to apply the invention to a wheeled transport vehicle by which mortar, concrete or the like is transported from a supply location to a selected site in a substantially dry-mixed condition before being mixed with water and discharged from the vehicle, there is no limitation in this respect as the invention may also be applied to, say, either a fixed level site storage and mixing hopper or a hydraulically or otherwise suitably operated tilting site storage and mixing hopper and also similar apparatus as will be hereinafter described.

By the expressions "a dry-mixed or moist-mixed condition" and "a substantially dry-mixed condition" is meant that the constituents of the concrete, mortar or the like, although thoroughly mixed, contain either no water at all, or at most a total moisture content of about 5% only.

It is more desirable to convey a load of concrete, mortar or like in a substantially dry-mixed condition than in a fully wetted condition since then the tendency of the mixture to harden or set is greatly minimised. Not only so, but the mixture is also less likely to become compacted by the movements and the vibration of the vehicle, thus facilitating eventual discharge of the load. The substantial absence of both of these tendencies permits a dry-mixed or a moist-mixed concrete, mortar or the like to be transported over much longer distances from the supply plant than would be possible with fully wetted concrete.

Accordingly, the primary object of the present invention is to provide, in a wheeled transport vehicle or in a site storage and mixing hopper or the like, means for adding the required quantity of water to, and distributing it throughout, the concrete, mortar or like mixture at a point of discharge.

Thus, one particular aim is to attain a substantial economy over the present method of transporting concrete, mortar or the like in agitating vehicles, this greater economy being achieved firstly by a reduction in the cost of the transport vehicle itself and an increase in the carrying capacity of the latter, and secondly by a great increase in the effective radius of operation of the said vehicle from a central supply plant.

Now, heretofore, when concrete has been carried for any distance in a road vehicle of the type having a tipping body furnished with a conventional hinged, i.e. swinging, tail-gate, difficulty has been encountered when attempting to discharge the load through the said gate. This difficulty is primarily due to the fact that the concrete becomes compacted, in transit, so that discharge can only be achieved by tipping the body to its extreme inclination and, even then, the concrete is usually deposited in an uncontrolled manner into a single heap.

Consequently, a secondary object of this invention is to associate with the aforementioned means in a wheeled transport vehicle for adding water to and distributing it through a concrete, mortar or like mixture at the location of discharge of the load from the vehicle, simple and efficient means designed to effect such discharge of the load from the vehicle in a controlled and regular manner.

But although the invention is advantageously applicable to a road vehicle of the type having a tipping body as aforesaid, here again there is no limitation in this regard. Thus, for instance, the invention is equally applicable to any appropriate road transport vehicle having a fixed body. Moreover, the invention may even be applied to a rail wagon: such an application would, for example, be advantageous when transporting concrete to prearranged locations alongside a rail track, say during the building of pylon foundations in connection with rail electrification work.

Broadly considered, the mixing plant constituting this invention comprises, in combination, a container body for concrete, mortar or the like in a substantially dry-mixed condition, at least one feed worm which is in communication with the interior of the said body and is arranged for rotation in a trough having therein or communicating with at least one discharge opening, a mixing chamber which is associated with the trough and is adapted to receive substantially dry-mixed material discharged by the action of the feed worm or worms through the said opening and, accommodated within the mixing chamber, water distributing means and a mixing component or components which latter is or are designed to mix distributed water with the infed initially dry-mixed material and simultaneously to effect a controlled and regular discharge from the mixing chamber of a finally mixed and wet concrete, mortar or the like.

The broad idea, as will be appreciated is to add to the concrete or the like, the dry or substantially dry constituents of which are already thoroughly mixed, the required quantity of water and to uniformly distribute the latter through the initial mix at the point of discharge from the vehicle, hopper or the like so that, in the result, the load, now finally mixed and in a wet condition, is regularly discharged in a controlled manner.

The or each feed worm may conveniently consist of a steel screw of Archimedean spiral type arranged for rotation in a trough made of tough rubber or an equivalent flexible material, the said screw being either of variable pitch or tapered to ensure uniform draw-off across its length.

Similarly, the or each mixing component may advantageously consist of a steel screw which is encased in a further tough rubber or equivalent trough constituting a wall of the mixing chamber, the said trough having either an open end or an opening therein through which the finally mixed and wet concrete, mortar or the like is discharged.

In one embodiment of the invention the mixer is fixed in a horizontal or approximately horizontal position so that the finally mixed and wet concrete, mortar and the like can be discharged from the mixer either direct into barrows, skips or similar receptacles or onto a portable belt conveyor.

Alternatively, however, the mixer may be portable to enable it to be additionally used as a placing conveyor.

In order that the invention may be more clearly understood and readily carried into practical effect, specific examples thereof will now be described with reference to the accompanying purely diagrammatic drawings, wherein:

FIGURE 1 is a side view of a road transport truck of the tipping body type to which is applied one form of the mixing plant provided by this invention, FIGURE 2 is a rear view of the said truck, illustrating the manner in which the mixer is adapted to be stowed beneath the tipping body when not in use, FIGURE 3 is a detail plan view of the longitudinal support rails and the rollers by means of which the stowed mixer is supported beneath the truck body, FIGURE 4 is a cross-sectional view of the same taken on the line IV—IV of FIGURE 3.

Figure 18:
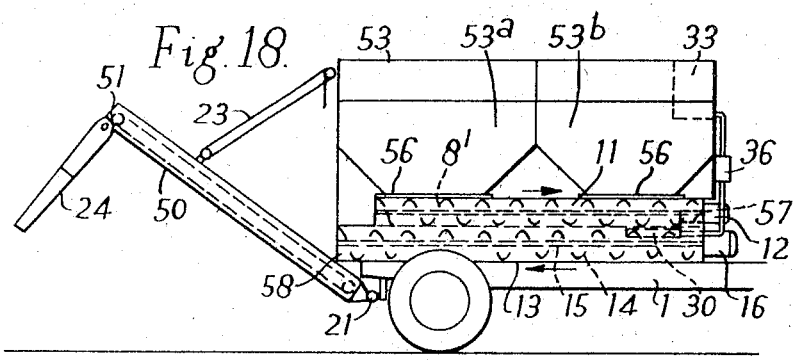
Figure 19:
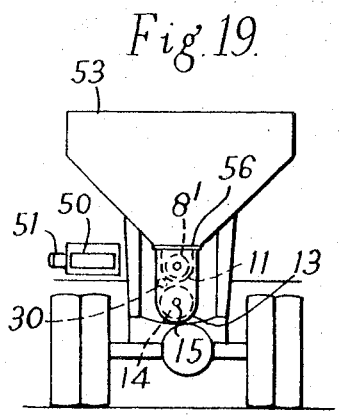
Figure 20:
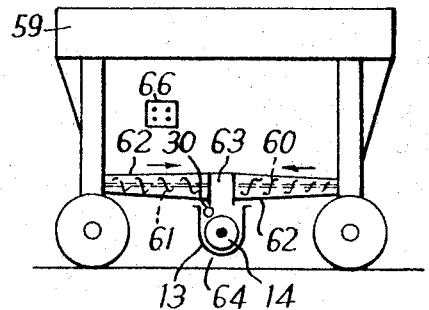
Figure 21:
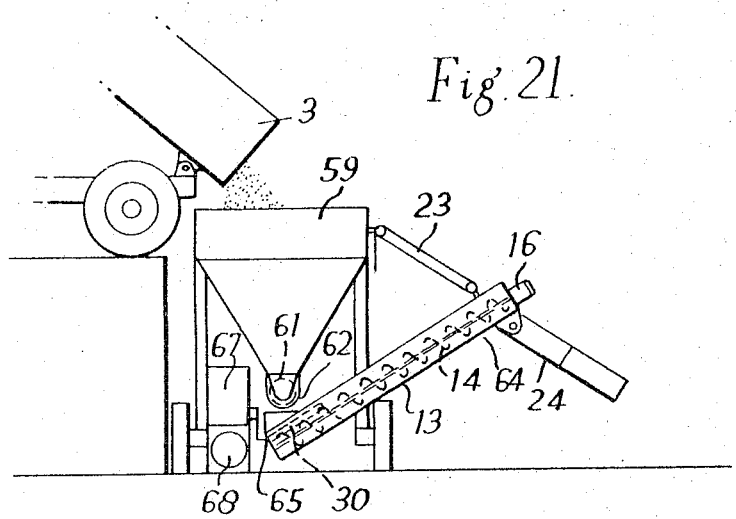
Figure 22:
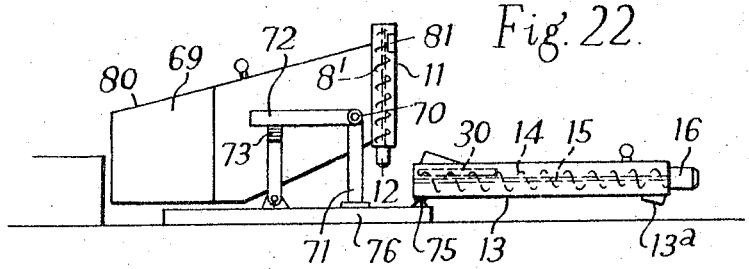
Figure 23:
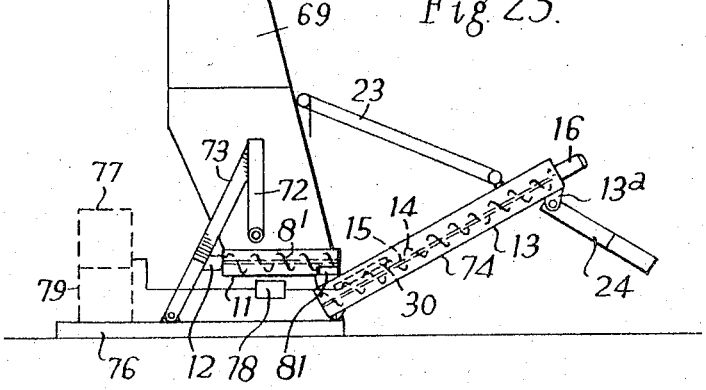

FIGURE 5 is a diagrammatic plan of the hydraulic system of the tipping truck shown in FIGURES 1 and 2, FIGURES 6 and 6A are respectively side and end views of the water pipe arrangement associated with the mixer screw, FIGURE 7 is a diagram representing one possible form of water circuit for the mixing plant, FIGURE 8 is a similar diagrammatic representation of an alternative water circuit, FIGURES 9, 10 and 11 are three cross-sectional views showing respectively different operating positions of one form of variable stroke pump which may be incorporated into a water circuit such, for instance, as that illustrated in FIGURE 8, FIGURES 12 and 13 are two views similar to FIGURES 1 and 2 respectively illustrating a further application of the invention to a road transport truck of the tipping body type but wherein both a feed worm and a mixing screw are provided within the tail-gate of the truck, FIGURE 14 is a plan view of the hydraulic system of the truck depicted in FIGURES 12 and 13, FIGURE 15 is a diagram showing this hydraulic system in more detail, FIGURES 16 and 17 are two views similar respectively to FIGURES 1 and 2, as also to FIGURES 12 and 13, illustrating the application of the invention to a road transport vehicle the body of which is constituted by a non-tipping hopper, FIGURES 18 and 19 are side and rear views respectively of another road transport vehicle with a non-tipping body, the vehicle in this case being equipped with a mixing plant including a forwardly operating feed screw and a rearwardly operating mixing screw arranged one above the other, as will be hereinafter described, FIGURES 20 and 21 are respectively front and side views of a fixed level site storage and mixing hopper equipped with mixing plant according to this invention, and FIGURES 22 and 23 are diagrammatic sectional views illustrating the application of the invention to a hydraulically operated tilting site storage and mixing hopper.

Like parts are designated by similar reference characters throughout the drawings.

Referring to FIGURES 1 and 2, the chassis of the illustrated road transport truck is designated by the numeral 1, the driver's cab by the numeral 2 and the tipping body, hinged at 3a, by the numeral 3. The conventional swinging tail-gate at the rear end of the body 3 is replaced by a specially designed fixed tail-gate 4 in which is provided a central discharge orifice 5 adapted normally to be closed by a hinged door or flap 6. Whenever it is open, this door or flap 6 is retained in position by a short chain 7 (see FIGURE 1). Opposed right- and left-handed feed worms 8 and 9, secured upon a single shaft 10, and located at respectively opposite sides of the central discharge orifice 5, are arranged for rotation in a trough 11 mounted on the tail-gate 4. In this case, orifice 5 is actually formed in the rear wall of the said trough. A hydraulic motor 12 for driving the shaft 10 is provided at the left-hand end of the latter as viewed from the rear of the truck (see FIGURE 2). The opposite ends of the trough 11 are in communication with the interior of the tipping body 3. The function of the feed worms 8 and 9 is to continuously convey substantially dry-mixed concrete or the like (passing from the said body into the trough through the inlets) along the trough in opposite directions towards the central orifice 5 from which latter the material is forcibly discharged by the worms. Each of the feed worms 8 and 9 consists of a twin steel screw of Archimedean spiral type. Preferably, the trough 11 is made of a specially toughened rubber or an equivalent flexible material designed to prevent the pinching of the stone particles between the trough and the rotating screws. Moreover, a toughened rubber or like trough is well able to withstand the abrasive nature of a concrete or a mortar.

In this first example, a wall of the mixing chamber associated with the trough 11 consists of a further tough rubber or equivalent trough 13 in which is encased a steel mixing screw 14 of ribbon or solid Archimedean type. The mixing screw is secured upon a shaft 15 which is arranged to be driven from its rear end by a further hydraulic motor 16. The trough 13 is open at its rear end through which the finally mixed and wet concrete, mortar or the like is discharged. The said trough, moreover, is of U-shape in cross-section (see FIGURE 4) and is secured to a metal supporting frame 17 thereby to provide a complete mixer. This mixer, which is portable to enable it to be additionally used as a placing conveyor, is stowable, when not in use, between longitudinal support rails 18 of channel form extending horizontally beneath the floor 19 of the tipping body 3. As will be clearly seen in FIGURES 3 and 4, rollers 20, fitted within the frame 17, with their axes horizontal, are arranged to run in the support rails 18. The complete mixer is, therefore, withdrawable rearwardly from beneath the body 3 and, when so withdrawn, is arranged to be supported on an articulated shackle 21 (see FIGURE 1). When the said mixer is withdrawn, moreover, the front end thereof is suspended from the point 22 on the fixed tail-gate 4 by means of a winch-operated cable or chain 23. The mixer frame 17 is accordingly adapted to be swung both horizontally, and also upwards and downwards in various vertical planes, suchwise as to convey the finally mixed and wet concrete, mortar or the like to a desired position. A removable steel chute, such as that indicated at 24 in FIGURE 1, is temporarily attached to the discharge end of the mixer frame 17 to facilitate deposition of the finally mixed product at the precise locations selected.

In the example now being described, the hydraulic system of the vehicle, incorporating the two hydraulic motors 12 and 16 for driving the shafts 10 and 15 respectively, is diagrammatically represented in FIGURE 5. The system also includes a body tipping cylinder and ram device 25, the three components 12, 16 and 25 being operated by oil delivered by a pump 26 and controlled through the medium of a 2-bank-4-way control valve indicated at 27. The pump 26 is driven from a power take-off gear box of the vehicle. Fine feed trimmers may be provided at the locations 28, and the numeral 29 indicates flexible connections for the hydraulic system.

The water distributing means include a water pipe 30 having therein longitudinally spaced holes or nozzles 31, this pipe being located within the trough 13 forming the mixing chamber—at or near the entry point of the substantially dry-mixed materials into said chamber. The water pipe 30 may either be a comparatively short one, as depicted in FIGURE 1, or it may extend longitudinally within and practically the full length of the trough 13 as shown at $30^1$ in FIGURES 6, 7 and 8. In any event, and as clearly seen in FIGURE 6, the holes or nozzles 31 are progressively smaller in size from the aforementioned entry point towards the discharge end 13a of the trough 13. The particular water pipe $30^1$ illustrated in FIGURE 6, moreover, is furnished at predetermined points therealong with on/off taps 32 whereby the effective length of the said pipe can be varied. The water system may, as shown, include a water tank 33 to make it self-contained, this tank being mounted upon the front of the tipping body 3. In FIGURE 1 flow and return water pipes are indicated at 34 and 35 respectively. The system is adapted to provide a controlled water feed, e.g. by gravity, or by a variable-stroke, centrifugal or any other suitable type of pump.

The general water circuit illustrated in FIGURE 7, which may advantageously be applied to the truck shown in FIGURES 1 and 2, includes a 3-way flow and return control valve 37 and a flexible connection 38. The rate of water flow is variable in step with any appreciable variation in the rate of feed of the dry-mixed concrete, mortar or the like fed from the body 3 by the feed worms 8 and 9. This rate of water flow in the FIGURE 7 arrangement is automatically varied by means of a solenoid valve 39 arranged to influence the 3-way flow and return valve 37, the said solenoid valve 39 being actuated by electric or electronic means arranged to be influenced by signals received from a moisture sensing device 40 placed an appropriate distance along the mixer. The positive (+) and negative (−) sides of the sensing device circuit are indicated more clearly in FIGURE 6A.

Alternatively, the modified water circuit shown in FIGURE 8 may be adopted. In this case there is no return to the water tank 33, the solenoid valve 39 influences the output of a variable stroke pump $36^1$, and the circuit includes a relief valve 41 arranged as shown. It is primarily the intention to incorporate in this particular water system a "Rotoplunge" variable-stroke pump as manufactured by Parkinson Cowan and the basic construction and the principle of operation of which will now be briefly described with reference to FIGURES 9, 10 and 11.

Thus, the illustrated variable stroke pump comprises a casing 42 having inlet and outlet parts 43 and 44 respectively. Within the casing is mounted a rotor 45 having therein a diametrally extending bore constituting a cylinder 46. For movement axially back and forth within the cylinder 46 is provided a plunger 47 which is transversely slotted at 47a to receive a block 48 mounted upon an eccentric pin 49. Assume that the rotor 45 is turning anti-clockwise. Then, with the plunger 47 moving in the direction of the relevant arrow in FIGURE 9, water is being drawn from the inlet port 43 into the uppermost end of the cylinder 46 and simultaneously expelled from the lowermost end of the latter into outlet port 44. In FIGURE 10, the plunger 47 has reached one extremity of its stroke in the same direction, all the water in the initially lowermost but now uppermost end of the cylinder 46 having been expelled, and the initially uppermost but now lowermost end of the said cylinder being full of water and isolated from the inlet port 43. The direction of the plunger reverses at this stage, with the result that water is drawn into what was last the uppermost end of the cylinder and, as the rotor continues to turn, water is again expelled from the opposite end of the cylinder (see FIGURE 11). The output of the pump is determined by the stroke of the plunger 47 which in turn depends on the position of the eccentric pin 49—actuated by the solenoid valve 39 in the FIGURE 8 arrangement.

In an alternative form of the invention, again applied to a road transport truck of the tipping body type illustrated in FIGURES 12 and 13, a single feed worm $8^1$, a tough rubber or equivalent trough 11 encasing the same, a steel mixing screw 14, a mixing chamber in the form of a further similar trough 13 accommodating the said screw and the water pipe 30 are all provided within a fixed tail-gate 4 mounted upon the rear end of the tipping body 3. The trough 13 has therein an opening 13b (see FIGURE 13) through which wet mixed concrete, mortar or the like is discharged on to a portable belt conveyor 50. This placing conveyor, when not in use, is stowed beneath the body 3, between channel supports and is adapted to be longitudinally withdrawn, when required, in much the same way as the mixer in the first described example. Moreover, like such mixer, the belt conveyor 50, which is arranged to be driven by a hydraulic motor 51, is articulated upon an articulated shackle 21 and is suspended from the tail-gate by a winch-operated cable or shaft $23^1$. As will be seen in FIGURE 13, the axes of the feed worm $8^1$ and the mixing screw 14 extend parallel to one another, the feed discharge point of the said worm being at 11a, i.e. at the opposite side of the vehicle to the final discharge opening 13b. The hydraulic arrangement for the vehicle just described is illustrated both in FIGURE 14 and also, in a more diagrammatic fashion, in FIGURE 15. This arrangement includes a 3-bank-4-way control valve 52 for controlling the supply of oil to the feed, mixer and conveyor motors 12, 16 and 51 respectively. As before, fine feed trimmers are indicated at 28 and flexible connections at 29. The conveyor 50 is fitted at its discharge end with a removable chute 24.

Referring now to the further example of the invention shown in FIGURES 16 and 17, the feed worms $8^1$ in its trough 11 is so arranged longitudinally at the bottom of a non-tipping hopper 53 of a road transport vehicle as to discharge dry-mixed concrete, mortar or the like at 54, i.e. from the rear of the vehicle, and the inner end of a mixer cum placing conveyor, designated generally by the numeral 55, is articulated to the vehicle at 21 and adapted at its outer end to be suspended from a point on the back of the said hopper by means of a winch-operated cable or chain 23. Thus, in this example, the mixer, comprising the screw 14 driven by a hydraulic motor 16 and mounted in its trough 13 is portable to enable it to be additionally used as a placing conveyor. The hopper 53 is divided into two compartments 53a and 53b under each of which is fitted a slider 56 enabling a controlled feed of material from the hopper 53 on to the feed worm $8^1$. When not in use, the mixer cum placing conveyor 55, mounted on rollers, is disposed alongside the hopper 53 and is longitudinally withdrawable as and when required.

In the alternative application of the invention to a road transport vehicle with non-tipping hopper 53, illustrated in FIGURES 18 and 19, there extend one above the other, longitudinally beneath the said hopper, a feed screw, 8′, mounted in a trough 11 and designed to feed dry-mixed concrete, mortar or the like in a forward direction towards a feed discharge point 57, and a mixing screw 14 mounted in another trough 13 and designed to convey finally mixed wet material rearwardly for discharge at 58 from the back end of the last mentioned trough. As shown, the wet mixed material discharges on to a placing conveyor 50 similar to that depicted in FIGURES 12 and 13; in this case, however, the conveyor 50, when not in use, is stowed alongside the hopper 53. If desired, the feed screw 8′ together with its trough 11 may be completely removable and reversible in direction to adapt the vehicle for use in carrying granular or like material not requiring to be mixed.

In FIGURES 20 and 21 the container body consists of a fixed level site storage and mixing hopper 59 having twin feed worms 60, 61 located along the bottom thereof. These feed worms, driven either by a single hydraulic motor or by two separate hydraulic motors, are located in trough means 62 having a central discharge opening 63. A mixer 64, comprising as before a mixing screw 14 accommodated in a trough 13 along with a water pipe 30, is articulated at 65 beneath the hopper 59 and is suspended from a point at the top of the latter by a winch-operated cable or chain 23. In FIGURE 20, a control panel is indicated at 66, whereas in FIGURE 21, the water tank and pump are represented at 67 and the main hydraulic pump unit at 68. Dry-mixed material may be dumped into the hopper 59 from the tipping body 3 of a road transport vehicle as shown in FIGURE 21.

The container body in the final example illustrated in FIGURES 22 and 23 consists of a hydraulically operated tilting site storage and mixing hopper 69 fitted with a horizontal shaft 70 arranged to turn in bearings provided in upright supports 71 located at opposite sides of the hopper. The shaft 70 has secured thereon arms such as 72 adapted to be acted upon by elevating rams 73 by means of which the hopper 69 can be turned from the low position (FIGURE 22) in which it can receive dry-mixed concrete, mortar or the like, e.g. from a tipping body of a transport vehicle, to an upright feeding position (FIGURE 23), and vice versa. In this case a feed screw 8' accommodated in a trough 11 is located at the bottom of the hopper 69—considered in its upright position. The mixer 74, functioning also as a placing conveyor, is mounted at its inner end upon an articulated shackle support 75 on the base 76 of the plant. With the hopper 69 upright, the opposite end of the mixer is suspended therefrom by a winch-operated cable or chain 23. As in other examples, the mixer 74 comprises a trough 13 in which are provided both a rotary mixing screw 14 and a water distributing pipe 30. The water tank, the water pump and the main hydraulic pump unit are represented at 77, 78 and 79 respectively (see FIGURE 23). The tipper loading point is at 80 (FIGURE 22) and the feed discharge point at 81.

I claim:

1. A wheeled transport vehicle which includes, in combination, a tipper body constituting a container for fluent materials in a substantially dry-mixed condition and having extending beneath it longitudinal supports and rollers; a tail-gate mounted upon the rear end of said tipper body; a first trough which is provided on said tail-gate and has therein between its ends an openable discharge orifice; a single shaft arranged for rotation in said first trough and having secured thereon opposed right and left-handed feed worms adapted for action upon the dry-mixed materials contained in the body for the purpose of discharging same through said discharge orifice; a mixer supporting frame which is stowable between and withdrawable from the aforesaid longitudinal supports; an articulated support shackle by which the mixer frame is supported when withdrawn thereby enabling the frame to be swung both horizontally and also vertically up and down; a second trough of U-shape in cross-section which forms a mixing chamber and is secured in said supporting frame, the inner end of this second trough, when the mixer frame is withdrawn, being located beneath the aforesaid discharge orifice in the first trough; water-distributing means in said second trough; at least one mixing screw of Archimedean type which is accommodated and rotatable in said second trough for the purpose of mixing distributed water with initially dry-mixed materials discharged into the said second trough through the aforesaid orifice and simultaneously effecting a controlled and regular discharge from the second trough of a finally mixed and wet fluent material; controllable means on the vehicle supplying power both to said single feed worm shaft and also to said mixing screw; and water flow control means on the vehicle by which water is fed to the said water-distributing means.

2. Mixing plant according to claim 1, wherein the front end of the mixer is adapted, when withdrawn from between the supports beneath the tipper body, to be suspended from a point on the tailgate by means of a winch-operated cable or chain.

3. A wheeled transport vehicle which includes, in combination, a non-tipping hopper constituting a container for fluent materials in a substantially dry-mixed condition; a first trough so arranged longitudinally at the bottom of said hopper; a rotary feed worm accommodated within said first trough and adapted to feed dry-mixed materials from the hopper in a rearward direction for discharge from the rear of the vehicle; a mixer frame the inner end of which is articulated to the vehicle; a winch-operated cable by which the outer end of said frame is suspended from a point on the back of said hopper; a second trough constituting a mixing chamber secured within said mixer frame with its inner end disposed to receive dry-mixed materials discharged from the rear of the vehicle; water-distributing means located within said second trough; a rotary mixing screw mounted within the second trough and operable to mix distributed water with the infed initially dry-mixed materials and simultaneously to effect a controlled and regular discharge from the mixing chamber; controllable means on the vehicle supplying power both to the feed worm and the mixing screw; and water flow control means on the vehicle by which water is fed to said water-distributing means, the articulated and suspended mixer functioning also as a placing conveyor.

4. In combination, a fixed level site storage and mixing hopper constituting a container for fluent materials in a substantially dry-mixed condition; a first trough extending along the bottom of said hopper, said trough having therein a discharge opening; rotary feed means arranged for rotation within the said first trough and adapted to feed dry-mixed materials from the hopper for discharge through the aforesaid discharge opening; a mixer frame the inner end of which is articulated to the hopper beneath the said discharge opening; a winch-operated cable by which the outer end of said frame is suspended from a point at the top of the hopper; a second trough secured within said mixer frame and constituting a mixing chamber; water-distributing means located within said second trough; a rotary mixing screw mounted within the second trough and operable to mix distributed water with the infed initially dry-mixed materials and simultaneously to effect a controlled and regular discharge from the mixing chamber; controllable means supplying power both to the feed means and the mixing screw, and water flow control means by which water is fed to said water-distributing means, the articulated and suspended mixer functioning also as a placing conveyor.

5. In combination, a supporting frame; a tilting site storage and mixing hopper which is turnable within said frame from a low position in which it can receive dry-mixed materials from a tipping body of a transport vehicle to an upright feeding position, and vice versa, means for operating said hopper under control, a first trough extending along the bottom of said hopper (considered in its upright position), said trough having a discharge opening at one end; rotary feed means arranged for rotation within said first trough and adapted to feed dry-mixed materials from the hopper for discharge through said end of the first trough; an articulated shackle support on the hopper-supporting frame; a mixer which is mounted at its inner end on said shackle support and includes a frame, a second trough secured within said frame, water-distributing means located in said second trough and a rotary mixing screw mounted in the last mentioned trough for mixing distributed water with the infed initially dry mixed materials and simultaneously conveying the finally mixed and wet fluent material from the outer end of the second trough; a winch-operated cable by which the outer end of the mixer is suspended from a point on the hopper; controllable means supplying power both to the rotary feed means and the mixing screw, and water flow control means by which water is fed to said water-distributing means.

6. A mixing plant comprising, in combination, a container body for fluent materials in a substantially dry-mixed condition; at least one steel feed screw of Archimedean spiral type which is in communication with said body; a first trough of a tough flexible material in which said feed screw is arranged for rotation, said first trough having a discharge opening; a metal supporting frame which is pivotally and portably mounted and is adapted to be swung both in a horizontal plane and also upwards and downwards in vertical planes; a mixing chamber carried by said supporting frame and associated with said first trough and adapted to receive substantially dry-mixed materials discharged by the action of said feed screw through said opening, a wall of the said chamber being constituted by a second tough and flexible trough of U-shape in cross-section secured to said metal supporting frame; water-distributing means within the mixing chamber; at least one mixing screw of Archimedean type which is accommodated and rotatable in said second trough for the purpose of mixing distributed water with the infed initially dry-mixed materials and simultaneously effecting a controlled and regular discharge from the mixing chamber of a finally mixed and wet fluent material; controllable means supplying power to the rotary feed and mixing screws, and water flow control means through which water is fed to said water distributing means.

7. Mixing plant comprising, in combination, a container body for fluent materials in a substantially dry-mixed condition; at least one rotary feed worm which is in communication with said body; a trough in which said worm is arranged for rotation, said trough having a discharge opening; a mixing chamber associated with said trough and adapted to receive substantially dry-mixed materials discharged by action of the feed worm through the opening; a water system including a water tank and associated water supply means; a water pipe which is connected to said tank and located at the entry point of the infed dry-mixed materials into the mixing chamber, said pipe having therein longitudinally spaced water-distributing orifices, a solenoid valve in said water supply pipe, a moisture sensing device placed an appropriate distance along the mixing chamber, electrical means for actuating said valve and arranged to be influenced by signals received from said moisture sensing device; mixing means accommodated within the mixing chamber for mixing distributed water with the said infed materials and simultaneously effecting a controlled and regular discharge from the mixing chamber of a finally mixed and wet fluent material, and controllable means supplying power to the feed worm and the mixing means, the rate of water flow being automatically varied, in step with any appreciable variation in the rate of feed of the dry-mixed materials fed from the container body into the mixing chamber by the feed worm, by means of said solenoid valve in said water supply pipe being actuated by said electrical means influenced by signals received from said moisture sensing device.

8. A wheeled transport vehicle which includes, in combination, a tipper body constituting a container for fluent materials in a substantially dry-mixed condition; a metal tail gate mounted upon the rear end of said tipper body; a first trough of toughened flexible rubber which is mounted on the lower edge portion of said tail-gate and has therein between its ends an openable discharge orifice; at least one steel screw feed means in said first trough adapted for action upon the dry-mixed materials contained in the body for the purpose of discharging same through said discharge orifice; a second trough of toughened flexible rubber of U-shape in cross-section which forms a mixing chamber, at least the inner end of this second trough being located beneath the aforesaid discharge orifice in the first trough; water-distributing means in said second trough; at least one mixing screw of Archimedean type which is accommodated and rotatable in said second trough for the purpose of mixing distributed water with initially dry-mixed materials discharged into the said second trough through the aforesaid orifice and simultaneously effecting a controlled and regular discharge from the second trough of a finally mixed and wet fluent material; controllable means on the vehicle supplying power both to said single feed worm shaft and also to said mixing screw; and water flow control means on the vehicle by which water is fed to the said water-distributing means.

9. A wheeled transport vehicle which includes, in combination, a tipper body constituting a container for fluent materials in a substantially dry-mixed condition; a metal tail-gate mounted upon the rear end of said tipper body; a first trough of toughened flexible rubber which is mounted on the lower edge portion of and within said tail-gate and has therein between its ends an openable discharge orifice; at least one metal screw feed means in said first trough adapted for action upon the dry-mixed materials contained in the body for the purpose of discharging same through said discharge orifice; a second trough of toughened flexible rubber of U-shape in cross-section which is mounted on the lower edge portion of and within said tail-gate and located beneath the first trough and forming a mixing chamber and having discharge orifice; water-distributing means in said second trough; at least one metal mixing screw means of Archimedean type which is accommodated and rotatable in said second trough for the purpose of mixing distributed water with initially dry-mixed materials discharged into the said second trough through the said orifice therein, and simultaneously effecting a controlled and regular discharge from the second trough of a finally mixed and wet fluent material; controllable means on the vehicle supplying power both to said metal screw feed means and also to said mixing screw; water flow control means on the vehicle by which water is fed to the said water-distributing means; and a placing conveyor, one end of which is located beneath the discharge orifice in said second trough.

10. A wheeled transport vehicle according to claim 9 wherein the tipper body has extending beneath it longitudinal supports and rollers and a frame supporting said placing conveyor is stowable between and withdrawable from said longitudinal supports and an articulated support shackle by which the placing conveyor is supported when withdrawn thereby enabling the frame to be swung both horizontally and also vertically up and down.

References Cited by the Examiner

UNITED STATES PATENTS

| 857,742 | 6/1907 | Lanquist | 259—161 |
| 1,492,061 | 4/1922 | Averil | 259—178 |
| 2,017,439 | 10/1935 | Grayson | 259—178 |
| 2,976,025 | 3/1961 | Pro | 259—178 |

FOREIGN PATENTS 935,921  9/1963  Great Britain.

IRVING BUNEVICH, *Primary Examiner.*

WALTER A. SCHEEL, *Examiner.*

R. W. JENKINS, *Assistant Examiner.*